United States Patent
McGough

(10) Patent No.: US 6,503,038 B2
(45) Date of Patent: Jan. 7, 2003

(54) REDUCED SHANK EXTERNAL FLOW PASSAGE BOLT WITH INTEGRAL PILOT

(75) Inventor: Matthew G. McGough, Hazel Park, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/822,296

(22) Filed: Mar. 30, 2001

(65) Prior Publication Data

US 2002/0141846 A1 Oct. 3, 2002

(51) Int. Cl.$^7$ ................................................. F16B 35/04
(52) U.S. Cl. ........................ 411/424; 411/392; 411/399; 285/190
(58) Field of Search .......................... 285/190; 411/379, 411/392, 399, 424

(56) References Cited

U.S. PATENT DOCUMENTS

| 2,895,368 A | * | 7/1959 | Place ..................... 411/392 X |
| 3,166,252 A | * | 1/1965 | O'Brien et al. .......... 285/190 X |
| 5,036,727 A | * | 8/1991 | Engel ...................... 411/399 X |
| 5,421,684 A | * | 6/1995 | Kluemper ............... 411/399 X |
| 6,264,414 B1 | * | 7/2001 | Hartmann et al. ...... 411/392 X |

* cited by examiner

*Primary Examiner*—Neill Wilson
(74) *Attorney, Agent, or Firm*—David L. Kuhn; Clifford C. Carter; Gail S. Soderling

(57) ABSTRACT

A specially designed bolt fastens together two parts of an engine and in particular can fasten together two components of a rocker arm assembly. The bolt is in a bore passing through the two components. The bolt has a full-diameter pilot that closely fits with the bore at a location where the components mate, and thereby locates the components relative to each other. On opposing axial sides of the pilot are reduced-diameter shank portions of the bolt, which form cylindrical gaps with the bore. The pilot has groove communicating the cylindrical gaps, whereby the gaps and grooves form an oil flow path along the bolt. A duct in each component communicates with a respective one of the cylindrical gaps, so that oil flows through one component, along the bolt and then into the other component.

4 Claims, 1 Drawing Sheet

REDUCED SHANK EXTERNAL FLOW PASSAGE BOLT WITH INTEGRAL PILOT

GOVERNMENT USE

The invention described here may be made, used and licensed by the or for the U.S. Government for governmental purposes without paying me any royalty.

BACKGROUND

In internal combustion engines, bolts are known that not only fasten engine components together but also allow lubricating or cooling fluid to flow between the components. A common type of such bolt is the so-called "banjo" bolt, which has an internal passage along its length and a port at either end. Also common are bolts in holes oversized along the bolts' shanks so that fluid can flow along the outside of the shanks. U.S. Pat. No. 4,881,926 to Aoki et al. shows features of both a banjo bolt and a bolt in an oversized hole. It is even known to provide bolts having grooves cut across the threads to create a fluid passageway (Japanese Patent Abstract 09021411 to Miura Kenji, Jan. 1, 1997).

Certain disadvantages exist in the known designs for bolts that permit fluid passage. Banjo bolts, for example, require internal axial drillings and cross drillings, and the axial drillings become more difficult as the bolt length increases. Bolts in oversized holes do not provide positive location and resistance to shear loads along the joint plane between two components connected by the bolt. Bolts with grooves along the threads must be aligned with complimentary grooves in bolt hole threads in order to be effective as flow passages.

SUMMARY

I have invented a fastening arrangement wherein the bolt positively locates two components relative to one another, resists the aforementioned shear loads, allows fluid passage and is easier to fabricate than a banjo bolt. My bolt has two reduced-diameter shank sections that together comprise most of the bolt's length. The reduced-diameter shank sections lower axial stiffness of the bolt, resulting in lower alternating stresses and greater fatigue life, which is especially desirable in aerospace applications. The reduced diameter sections define radial gaps with the bolt hole to allow fluid passage along the bolt. Between the reduced diameter sections is a full-diameter pilot, which is at the joint plane between the components, resists shear forces and accurately locates the components relative to each other. Axial or slightly helical grooves in the pilot allow fluid to flow across the pilot from one section of the reduced-diameter shank to another.

DETAILED DESCRIPTION

Figure 1:
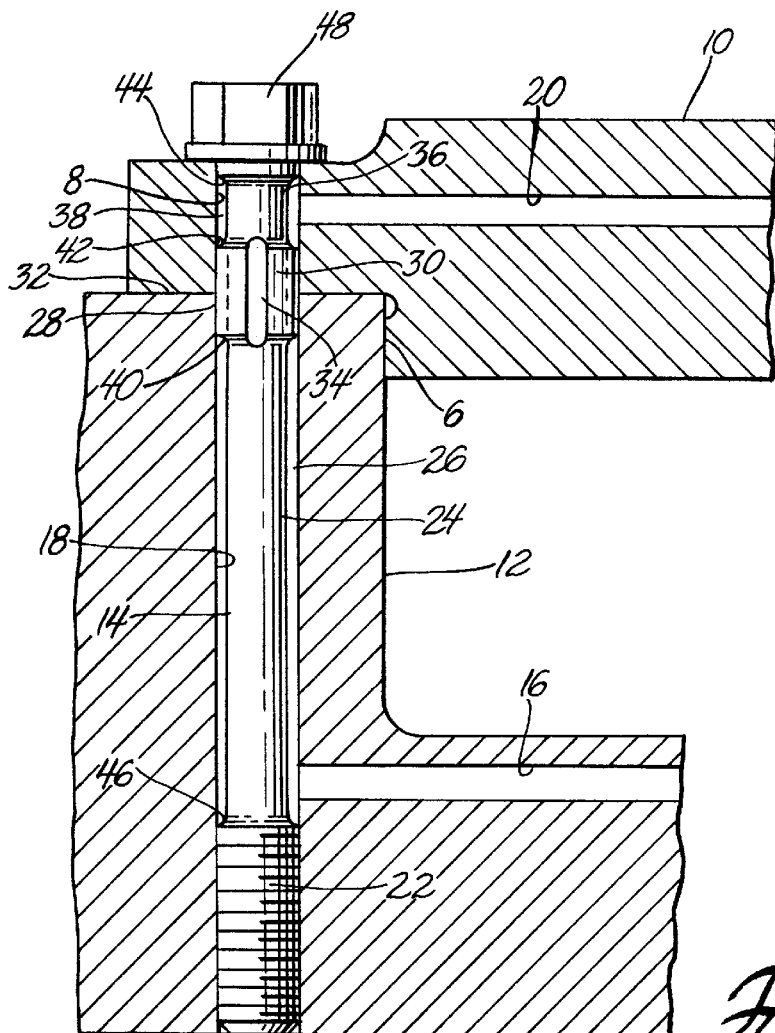
FIG. 1 shows the bolt fastening two components of the rocker arm assembly of an engine, the components being in section and only partially shown.
Figure 2:
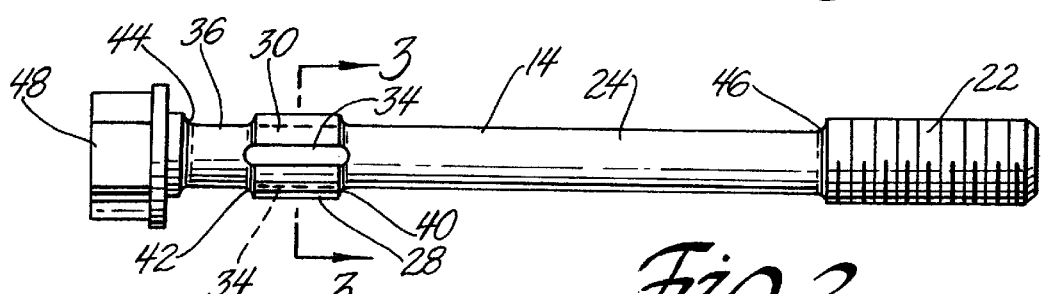
FIG. 2 is a view of the bolt alone.
Figure 3:
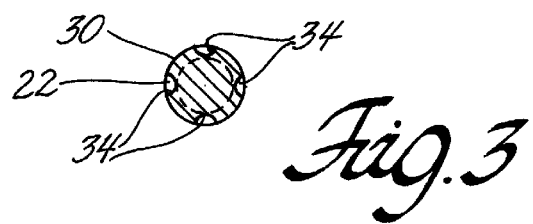
FIG. 3 is a section along line 3—3 in FIG. 2.

In FIG. 1 is a portion of a diesel engine having a rocker shaft 10 on which pivot a plurality of rocker arms (not shown). Shaft 10 is affixed by a specially designed bolt 14 to rocker housing 12, which is fixed directly or by intermediate structure to an engine block (not shown). There is a flat interface 6 between the end of shaft 10 and the housing, whereby the shaft is rotationally stationary relative to the longitudinal axis of bolt 14. Engine oil flows through duct 16 of the rocker housing to bore 18, flows past bolt 14, flows through bore 8, enters duct 20 of shaft 10 and lubricates the rocker arms before returning to a reservoir.

Bolt 14 is an elongate bolt threaded only at a relatively short region 22 near its lead end. In the particular embodiment shown, a reduced-diameter section 24 of the bolt spans a majority of the bolt's overall length, although in other applications, section 24 may not need to be so long relative to the overall bolt length. Section 24 and bore 18 define therebetween an elongate annular passageway 26 extending from region 22 to a full-diameter pilot 28 integrally formed with the bolt.

Pilot 28 has a set of curved faces 30 that fit closely against the inner surface of bore 18 and the inner surface of bore 8 in rocker shaft 10. The pilot thereby accurately locates the joined rocker shaft and rocker housing at their joint plane 32 and thereby resists shear loads in this plane. No additional components such as dowel rings or pins are needed for accurate location. Pilot 28 also has a set of oil passage grooves 34, which are oriented generally axially to avoid stress concentration in axial loading. Grooves 34 are shown in the figures with an exact axial orientation relative to bolt 14, but these grooves may have a shallow helix angle if desired. The width and depth of grooves 34 is controlled so as to insure adequate flow area while maintaining shear load capacity of the pilot.

On the opposite side of pilot 28 from reduced-diameter section 24 is another reduced-diameter section 36 of the bolt. Section 36 cooperates with bore 8 to define oil passageway 38, which is closed at one end by bolt head 48. In the particular embodiment shown section 36 is shorter than section 24, but this need not be true in all cases. The reduced-diameter sections not only allow oil flow, but also reduce axial stiffness of the bolt, resulting in less alternating stress and consequent tendency of bolt fatigue failure. To better reduce the axial stiffness, it is preferred that the combined length of the reduced-diameter sections comprises a majority of the length of the bolt.

Between the pilot 28 and the respective reduced-diameter sections are fillets 40 and 42 whose radii are chosen to reduce axial stress concentration to a desired level. Preferably, favorable residual stresses are imparted to the fillets. This could be done by any conventional technique, such as peening or rolling. Other fillets 44 and 46, at the respective junctures of section 36 with bolt head 48 and section 24 with region 22, can be designed similarly to fillets 40 and 42.

I do not desire to be limited to the exact details of construction or method shown herein since obvious modifications will occur to those skilled in the relevant arts without departing from the spirit and scope of the following claims.

What is claimed is:

1. A structure wherein a fastener connects one component to another component at an interface, wherein the fastener allows fluid flow between the components while locating the components accurately with respect to each other, the structure comprising:

a first bore defined by the one component;

a second bore defined by the other component;

a first duct in the one component;

a second duct in the other component;

a pilot of the fastener located at the interface and fitting closely with the bores;

a threaded portion of the fastener engaging the first bore;

a first reduced-diameter section of the fastener between the pilot and the threaded portion;

a first radial gap defined between the first reduced-diameter section and the first bore, the first gap communicated with the first duct;

means for closing one end of the second bore;

a second reduced-diameter section of the fastener between the closing means and the pilot;

a second radial gap defined between the second reduced-diameter section and the second bore, the second gap communicated with the second duct; and a generally axially oriented groove in the pilot communicating the first gap with the second gap.

2. The structure of claim 1 wherein the combined axial lengths of the first reduced-diameter section and the second reduced-diameter section comprises a majority of the overall length of the fastener.

3. A fastening structure for an internal combustion engine wherein a bolt connects one component to another component at an interface, wherein the bolt allows fluid flow between the components while locating the components accurately with respect to each other, the structure comprising:

a first bore defined by the one component;

a second bore defined by the other component;

a first duct in the one component;

a second duct in the other component;

a generally cylindrical pilot of the bolt located at the interface and having a curved face fitting closely with the bores to locate the one component relative to the other component;

a threaded portion of the bolt engaging the first bore;

a first reduced-diameter section of the bolt between the pilot and the threaded portion;

a first radial gap defined between the first reduced-diameter section and the first bore, the first gap communicated with the first duct;

a head of the bolt at one end of the second bore;

a second reduced-diameter section of the bolt between the head and the pilot;

a second radial gap defined between the second reduced-diameter section and the second bore, the second gap communicated with the second duct; and a generally axially oriented groove in the curved face of the pilot communicating the first gap with the second gap.

4. The structure of claim 3 further comprising residually stressed fillets on the pilot adjacent the reduced diameter sections of the bolt.

* * * * *